(12) United States Patent
Abdul Aziz et al.

(10) Patent No.: US 10,993,087 B1
(45) Date of Patent: Apr. 27, 2021

(54) COMMUNICATION SYSTEMS WITH CALL INTERRUPT CAPABILITIES

(71) Applicant: Motorola Solutions, Inc., Chicago, IL (US)

(72) Inventors: Mohd Syazani Abdul Aziz, Coral Springs, FL (US); Shivakumar Bangalore Ramu, Weston, FL (US)

(73) Assignee: Motorola Solutions, Inc., Chicago, IL (US)

( * ) Notice: Subject to any disclaimer, the term of this patent is extended or adjusted under 35 U.S.C. 154(b) by 0 days.

(21) Appl. No.: 16/701,309

(22) Filed: Dec. 3, 2019

(51) Int. Cl.
*H04W 4/10* (2009.01)
*H04W 84/08* (2009.01)
*H04W 4/16* (2009.01)
*H04W 72/10* (2009.01)
*H04W 72/00* (2009.01)
*H04W 4/08* (2009.01)

(52) U.S. Cl.
CPC ............... *H04W 4/10* (2013.01); *H04W 4/08* (2013.01); *H04W 4/16* (2013.01); *H04W 72/005* (2013.01); *H04W 72/10* (2013.01); *H04W 84/08* (2013.01)

(58) Field of Classification Search
CPC ........... H04W 4/10; H04W 4/08; H04W 4/16; H04W 72/005; H04W 72/10; H04W 84/08
USPC .................................................. 455/518, 519
See application file for complete search history.

(56) References Cited

U.S. PATENT DOCUMENTS

| 5,251,327 | A | * | 10/1993 | Lenchik | ................ | H04W 84/08 |
| | | | | | | 455/413 |
| 5,463,617 | A | | 10/1995 | Grube et al. | | |
| 6,999,438 | B2 | | 2/2006 | Nounin et al. | | |
| 7,266,382 | B2 | * | 9/2007 | Noel | ..................... | H04W 76/45 |
| | | | | | | 455/518 |
| 7,515,541 | B2 | | 4/2009 | Sandhu | | |
| 7,551,612 | B2 | * | 6/2009 | Kobayashi | ................ | H04L 5/16 |
| | | | | | | 370/368 |
| 7,606,261 | B2 | * | 10/2009 | Salovuori | ............. | H04W 88/16 |
| | | | | | | 370/466 |
| 7,626,984 | B2 | * | 12/2009 | Napierala | ........... | H04L 12/1836 |
| | | | | | | 370/389 |

(Continued)

FOREIGN PATENT DOCUMENTS

| CN | 1148721 | 5/2004 |
| EP | 2025101 | 8/2018 |
| WO | 01/06491 | 1/2001 |

*Primary Examiner* — Hai V Nguyen
(74) *Attorney, Agent, or Firm* — Baker Botts L.L.P.

(57) ABSTRACT

Some example communication systems include a fixed network equipment (FNE) operable to receive a talk group call from a first radio. The FNE is operable to transmit the talk group call to a second radio. The FNE is operable to receive a request for a high priority call. The communication system includes a gateway operable to transmit an interrupt signaling message through a broadband channel to the first radio. The interrupt signaling message includes instructions to de-key from the talk group call. Some example communication systems include a first radio operable to communicate with a second radio in a talk group call. The communication system includes a gateway operable to receive a request for a high priority call. The gateway is operable to transmit an interrupt signaling message through a broadband channel to the first radio. The interrupt signaling message includes instructions to make a high priority call decision.

20 Claims, 3 Drawing Sheets

(56) References Cited

U.S. PATENT DOCUMENTS

| | | | | |
|---|---|---|---|---|
| 7,738,392 B2* | 6/2010 | Walter | | H04L 43/0894 370/252 |
| 8,078,209 B2* | 12/2011 | Chowdhary | | H04W 72/005 455/518 |
| 8,144,846 B2* | 3/2012 | Gilbert | | H04W 76/30 379/93.02 |
| 8,189,460 B2* | 5/2012 | Shaffer | | H04L 65/80 370/229 |
| 8,271,009 B2* | 9/2012 | Bohn | | H04W 72/005 455/509 |
| 8,355,355 B2* | 1/2013 | Liao | | H04L 12/1877 370/312 |
| 8,711,732 B2* | 4/2014 | Johnson | | H04W 4/90 370/259 |
| 8,977,310 B2* | 3/2015 | Logalbo | | H04W 8/186 455/518 |
| 9,001,703 B2* | 4/2015 | Kuehner | | H04W 76/45 370/262 |
| 9,232,522 B2* | 1/2016 | Khoo | | H04W 72/0446 |
| 9,319,851 B2* | 4/2016 | Yu | | H04W 76/40 |
| 9,497,768 B2* | 11/2016 | Jeng | | G08G 1/163 |
| 9,872,137 B2* | 1/2018 | Lee | | H04W 4/02 |
| 9,961,516 B1* | 5/2018 | Proctor | | H04L 5/16 |
| 10,051,442 B2* | 8/2018 | Proctor | | G06F 16/951 |
| 10,117,083 B1* | 10/2018 | Sabatino | | H04M 7/0012 |
| 10,178,708 B1* | 1/2019 | Gan | | H04W 4/10 |
| 10,257,740 B2* | 4/2019 | McDonald | | H04W 72/1242 |
| 10,264,623 B2* | 4/2019 | Lee | | H04W 4/02 |
| 10,271,370 B2* | 4/2019 | Atarius | | G01S 17/10 |
| 10,278,158 B2* | 4/2019 | Rudolf | | H04L 12/1863 |
| 10,425,776 B2* | 9/2019 | Bestor | | H04W 4/20 |
| 10,532,739 B2* | 1/2020 | Atarius | | H04W 76/20 |
| 2002/0077136 A1* | 6/2002 | Maggenti | | H04L 63/0428 455/518 |
| 2002/0196781 A1* | 12/2002 | Salovuori | | H04W 88/16 370/352 |
| 2003/0030561 A1* | 2/2003 | Yafuso | | G08B 21/0286 340/573.4 |
| 2005/0032538 A1* | 2/2005 | Noel | | H04W 4/10 455/518 |
| 2005/0032539 A1* | 2/2005 | Noel | | H04W 72/10 455/518 |
| 2005/0254440 A1* | 11/2005 | Sorrell | | H04L 29/06027 370/264 |
| 2006/0058052 A1* | 3/2006 | Plestid | | H04W 72/005 455/519 |
| 2006/0105793 A1* | 5/2006 | Gutowski | | H04W 72/005 455/518 |
| 2007/0088553 A1* | 4/2007 | Johnson | | G06F 3/162 704/257 |
| 2007/0124144 A1* | 5/2007 | Johnson | | H04L 69/40 704/246 |
| 2007/0197248 A1* | 8/2007 | Reich | | H04W 4/10 455/518 |
| 2007/0206533 A1 | 9/2007 | Wiatrowski et al. | | |
| 2008/0069006 A1* | 3/2008 | Walter | | H04L 43/0894 370/252 |
| 2008/0101360 A1* | 5/2008 | Napierala | | H04L 12/1836 370/390 |
| 2008/0146203 A1* | 6/2008 | Khawand | | H04W 76/36 455/414.1 |
| 2008/0153432 A1* | 6/2008 | Zhu | | H04W 4/10 455/90.2 |
| 2009/0261943 A1* | 10/2009 | Jana | | G08B 25/08 340/3.1 |
| 2010/0151895 A1* | 6/2010 | McDonald | | H04M 3/56 455/518 |
| 2011/0075599 A1* | 3/2011 | Liao | | H04L 12/1877 370/312 |
| 2011/0117835 A1* | 5/2011 | Bohn | | H04W 72/005 455/18 |
| 2012/0172083 A1* | 7/2012 | Logalbo | | H04W 8/186 455/525 |
| 2014/0031019 A1* | 1/2014 | Qi | | H04W 4/00 455/416 |
| 2014/0133318 A1* | 5/2014 | Kuehner | | H04W 4/10 370/252 |
| 2014/0148115 A1* | 5/2014 | Ibbotson | | H04W 4/90 455/404.1 |
| 2014/0192790 A1* | 7/2014 | Samuel | | H04J 3/1694 370/337 |
| 2015/0023227 A1* | 1/2015 | Khoo | | H04B 7/2656 370/280 |
| 2015/0079921 A1* | 3/2015 | Johnson | | H04W 4/90 455/404.1 |
| 2015/0117335 A1* | 4/2015 | Jeng | | H04L 67/325 370/329 |
| 2015/0271649 A1 | 9/2015 | Tran et al. | | |
| 2016/0135024 A1* | 5/2016 | Vaisanen | | H04W 4/16 455/414.1 |
| 2016/0183156 A1* | 6/2016 | Chin | | H04L 61/2007 370/331 |
| 2017/0094457 A1* | 3/2017 | Lee | | H04W 12/06 |
| 2017/0142756 A1* | 5/2017 | Lee | | H04W 76/45 |
| 2017/0230939 A1* | 8/2017 | Rudolf | | H04W 4/70 |
| 2017/0238359 A1* | 8/2017 | Atarius | | G01S 7/4817 370/259 |
| 2017/0310761 A1* | 10/2017 | Enomoto | | H04L 67/14 |
| 2018/0077208 A1* | 3/2018 | Li | | H04W 4/10 |
| 2018/0181656 A1* | 6/2018 | Proctor | | G06F 16/3329 |
| 2018/0184257 A1* | 6/2018 | Proctor | | G06N 5/02 |
| 2018/0317063 A1* | 11/2018 | Sabatino | | H04M 3/5116 |
| 2018/0359654 A1* | 12/2018 | McDonald | | H04W 76/50 |
| 2019/0082304 A1* | 3/2019 | Bestor | | G06F 16/90332 |
| 2019/0239193 A1* | 8/2019 | Rudolf | | H04W 4/70 |
| 2019/0241179 A1* | 8/2019 | Atarius | | G01S 7/4876 |
| 2019/0280760 A1* | 9/2019 | Xu | | H04B 7/15542 |
| 2020/0139961 A1* | 5/2020 | Atarius | | H04W 76/20 |

* cited by examiner

COMMUNICATION SYSTEMS WITH CALL INTERRUPT CAPABILITIES

BACKGROUND OF THE INVENTION

In communication systems, a first radio may transmit a talk group call through a channel to a second radio, thereby occupying the channel. Because the channel is occupied, the second radio, or other radios, may not be able to communicate through the channel.

SUMMARY

In some situations, it may be useful to permit high priority call to override other calls. For example, while a first radio is occupying a channel to communicate with a second radio, it may be desirable to allow another radio may to communicate with the first, second (or other) radios, for example, if the other radio needs to communicate an emergency. Upon such an emergency, it may therefore be desirable to stop ("de-key") the first radio from the talk group call such that the other radio can use the channel to transmit. Since the first radio is occupying the channel, the channel may be unusable to instruct the first radio to de-key. Therefore, current systems lack the ability to, while the first radio is transmitting, instruct the first radio to de-key such that the channel can be used for a high-priority call.

Disclosed herein are communication systems that solve this and other problems with prior communication systems, allowing, for example, the first radio to be interrupted, such that the other radio can use the channel for a high priority call, such as in an emergency.

In some example communication systems, a communication system may include a fixed network equipment (FNE). The FNE may be operable to receive a talk group call from a first radio. The FNE may be operable to transmit the talk group call to a second radio. The FNE may be operable to receive a request for a high priority call. The communication system may include a gateway. The gateway may be operable to transmit an interrupt signaling message through a broadband channel to the first radio. The interrupt signaling message may include instructions to de-key from the talk group call.

In some example communication systems, the FNE may be operable to, in response to the request for the high priority call, instruct the gateway to transmit the interrupt signaling message. The interrupt signaling message may instruct the first radio to accept the high priority call. The interrupt signaling message may instructs the first radio to not accept the high priority call.

In some example communication systems, the communication system may receive the request for the high priority call from a third radio.

In some example communication systems, the FNE may be operable to communicate on a first dedicated frequency with the first radio and communicate on a second dedicated frequency with the second radio.

In some example communication systems, the talk group call may be a trunked talk group call. In some example communication systems, the talk group call may be a unit-to-many call.

In some example communication systems, the communication system may include a first radio and a second radio. The first radio may be operable to transmit a talk group call to an FNE. The second radio may be operable to receive the talk group call from the FNE. The first radio may be operable to receive an interrupt signaling message through a broadband channel. The interrupt signaling message may include instructions to de-key from the talk group call.

In some example communication systems, the first radio may be operable to accept the high priority call in response to the interrupt signaling message.

In some example communication systems, the communication system may include a third radio. The third radio may be operable to transmit a request for the high priority call to the FNE.

In some example communication systems, the first radio may be operable to communicate on a first dedicated frequency and the second radio may be operable to communicate on a second dedicated frequency.

In some example communication systems, the talk group call may be a trunked talk group call. The talk group call may be a unit-to-many call.

In some example communication systems, a communication system may include a first radio. The first radio may be operable to communicate with a second radio in a talk group call. The communication system may include a gateway. The gateway may be operable to receive a request for a high priority call. The gateway may be operable to transmit an interrupt signaling message through a broadband channel to the first radio. The interrupt signaling message may include instructions to make a high priority call decision.

In some example communication systems, the high priority call decision may include de-keying from the talk group call. The high priority call decision may include moving to a new frequency.

In some example communication systems, the talk group call may be a trunked talk group call. The talk group call may be a unit-to-many call.

In some example communication systems, the first radio may be operable to accept the high priority call in response to the interrupt signaling message.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention and explain various principles and advantages of those embodiments.

Figure 1:
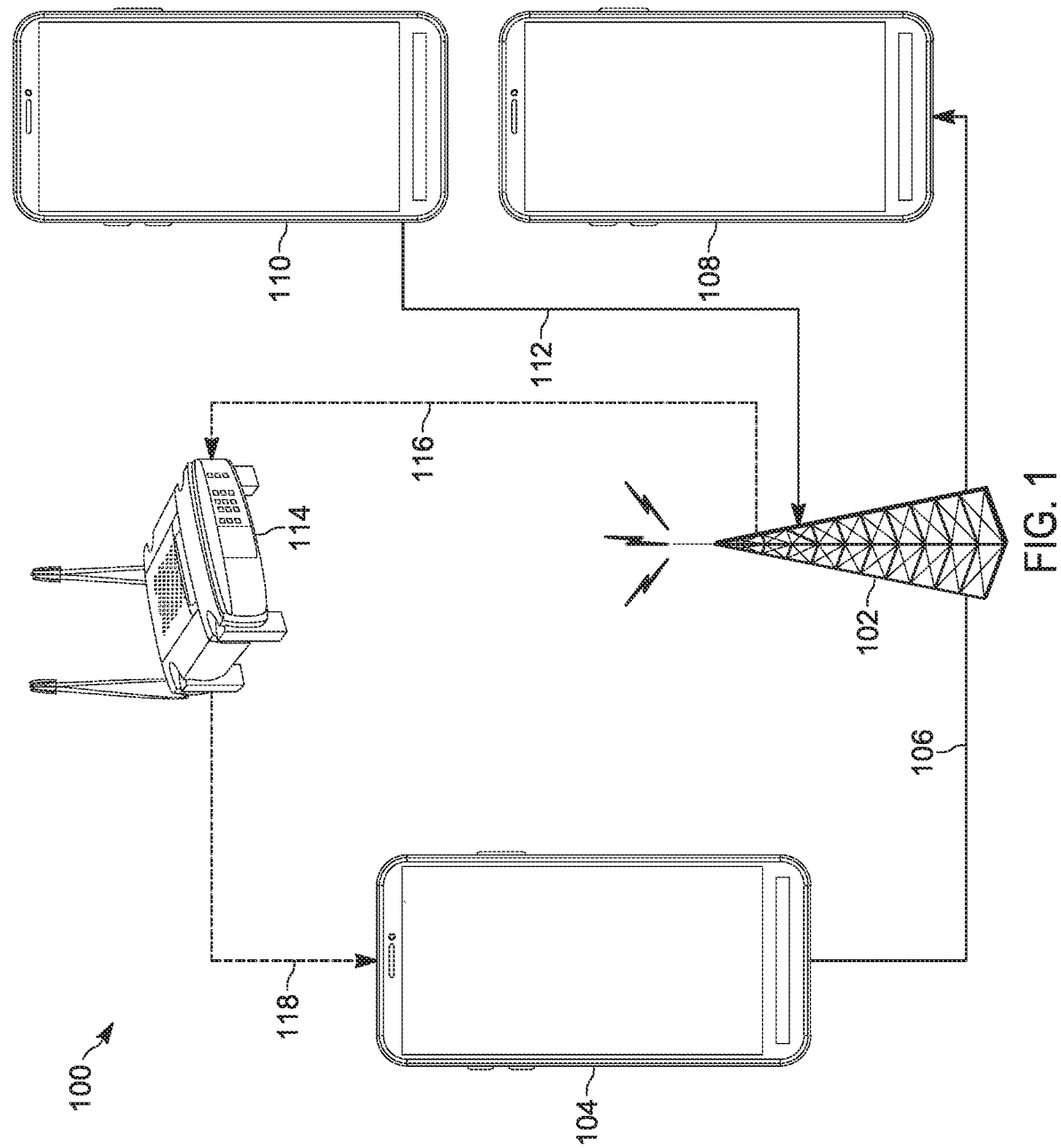
FIG. 1 is a schematic diagram of an example communication system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed herein are communication systems and methods with interrupt capabilities. For example, during communication in a talk group, a radio may be transmitting, occupying the channel used by talk group call, such that other radios cannot transmit in the talk group. Other radios may need to transmit a high priority call, such that it would be desirable to override the currently transmitting radio. Since the currently transmitting radio is occupying the channel by transmitting the talk group call, other radios or other components of a communication system cannot use the talk group to instruct the currently transmitting radio to stop occupying the channel by transmitting the talk group call (to "de-key"). Some example communication systems and methods disclosed herein allow for interrupting the radio such that another radio can transmit the high priority call. The other radio may transmit the high priority call using to the radios in the talk group or may use the channel previously occupied by the transmitting radio to transmit to other radios or other talk groups.

In some situations, it may be useful to permit high priority call to override other calls. For example, while a first radio is occupying a channel, transmitting a talk group call to communicate with a second radio, it may be desirable to allow another radio to communicate with the first, second (or other) radios. For example, it may be desirable to allow the other radio to communicate in the case of an emergency. Upon such an emergency, it may therefore be desirable to de-key the first radio from occupying channel and transmitting the talk group call, permitting the other radio to transmit. Since the first radio is occupying the channel, the channel may be unusable to instruct the first radio to de-key.

FIG. 1 shows an example communication system 100 in accordance with some embodiments. Other embodiments may include some, none, or any combination of the elements shown in FIG. 1. Other embodiments may include additional elements. To direct communications, the communication system 100 includes a fixed network equipment (FNE) 102. The FNE 102 may include a trunked radio system, operable to assign frequency channels. The FNE 102 may include any transmission system operable to receive, relay, and transmit electronic signals. The communication system 100 includes a first radio 104. The first radio 104 is shown transmitting a talk group call 106 to the FNE 102 via a channel. The first radio 104 may transmit the talk group call 106, using a variety of applications. For example, the first radio 104 may transmit the talk group call 106 based on a push to talk (PTT) application. The PTT application may be activated when a user employs an interface, such as pressing and holding a button.

The FNE 102 is transmitting the talk group call 106 to a second radio 108. The first radio 104 and the second radio 108 may be said to be part of a talk group, allowing communication between the two radios. Other radios may be included in the talk group simultaneously, at other times, or both. The talk group call 106 may occupy a channel of the FNE 102, the first radio 104, or both. A third radio 110 may need to transmit a high priority call to the FNE 102 using the channel occupied by the talk group call 106 or another resource of the FNE 102.

The second radio 108 is receiving the talk group call 106 from the FNE 102. Because the first radio 104 and the FNE 102 are currently transmitting the talk group call 106, the channel used by the FNE 102 and the first radio 104 to transmit the talk group call 106 may be occupied, meaning that the second radio 108 cannot transmit in the talk group. Accordingly, the FNE 102 may not be able to use the channel occupied by the talk group call 106 to transmit the request for a high priority call 112.

To allow the transmission of a high priority call, the communication system 100 includes a gateway 114. The third radio 110 transmits to the FNE 102 a request for a high priority call 112. The gateway 114 may be any device used to connect radios to a network. So that the high priority call can be transmitted, the gateway 114 facilitates the de-keying of the first radio 104 as follows. The FNE 102 receives the request for the high priority call 112, which may be sent with a high priority call. The FNE 102 is operable to receive the request for the high priority call 112 from the third radio 110. In response to the request for the high priority call 112, the FNE 102 is operable to send a gateway instruction 116 to instruct the gateway 114 to transmit an interrupt signaling message 118.

The gateway 114, upon receiving the gateway instruction 116, is operable to transmit the interrupt signaling message 118 to the first radio 104. The gateway 114 may be operable to transmit the interrupt signaling message 118 through a broadband channel to the first radio 104. The first radio 104 is operable to receive the interrupt signaling message 118 through the broadband channel. The gateway 114 may be operable to transmit the interrupt signaling message 118 through other channels.

The interrupt signaling message 118 may include instructions to de-key from the talk group call 106. The first radio, upon receiving the interrupt signaling message 118, may be operable to de-key from the talk group call 106, thereby freeing the FNE 102 to transmit the high priority call through the channel previously occupied by the talk group call 106.

The first radio 104 may be an intended recipient of the high priority call. The interrupt signaling message may instruct the first radio 104 to accept the high priority call. The first radio 104 may be operable to accept the high priority call in response to the interrupt signaling message. The first radio 104 may not be an intended recipient of the high priority call. The interrupt signaling message may instruct the first radio to not accept the high priority call.

FIG. 1 depicts only an example communication system 100. The talk group call 106 may be any electronic signal, containing electronic data. Such electronic data may include, for example, audio data. The talk group call 106 may be transmitted using one or more frequency division multiple access (FDMA) protocols. For example, the FNE 102 may be operable to communicate on a first dedicated frequency with the first radio 104 and communicate on a second dedicated frequency with the second radio 108. The first radio 104 may be operable to communicate on a first dedicated frequency and the second radio 108 may be operable to communicate on a second dedicated frequency. The talk group call 106 may be transmitted using other protocols such as time division multiple access (TDMA). The talk group call 106 may be in any format, such as a trunked group call or a unit-to-many call. While only three radios are shown in FIG. 1, the communication system 100 may be used with any number of radios.

Figure 2:
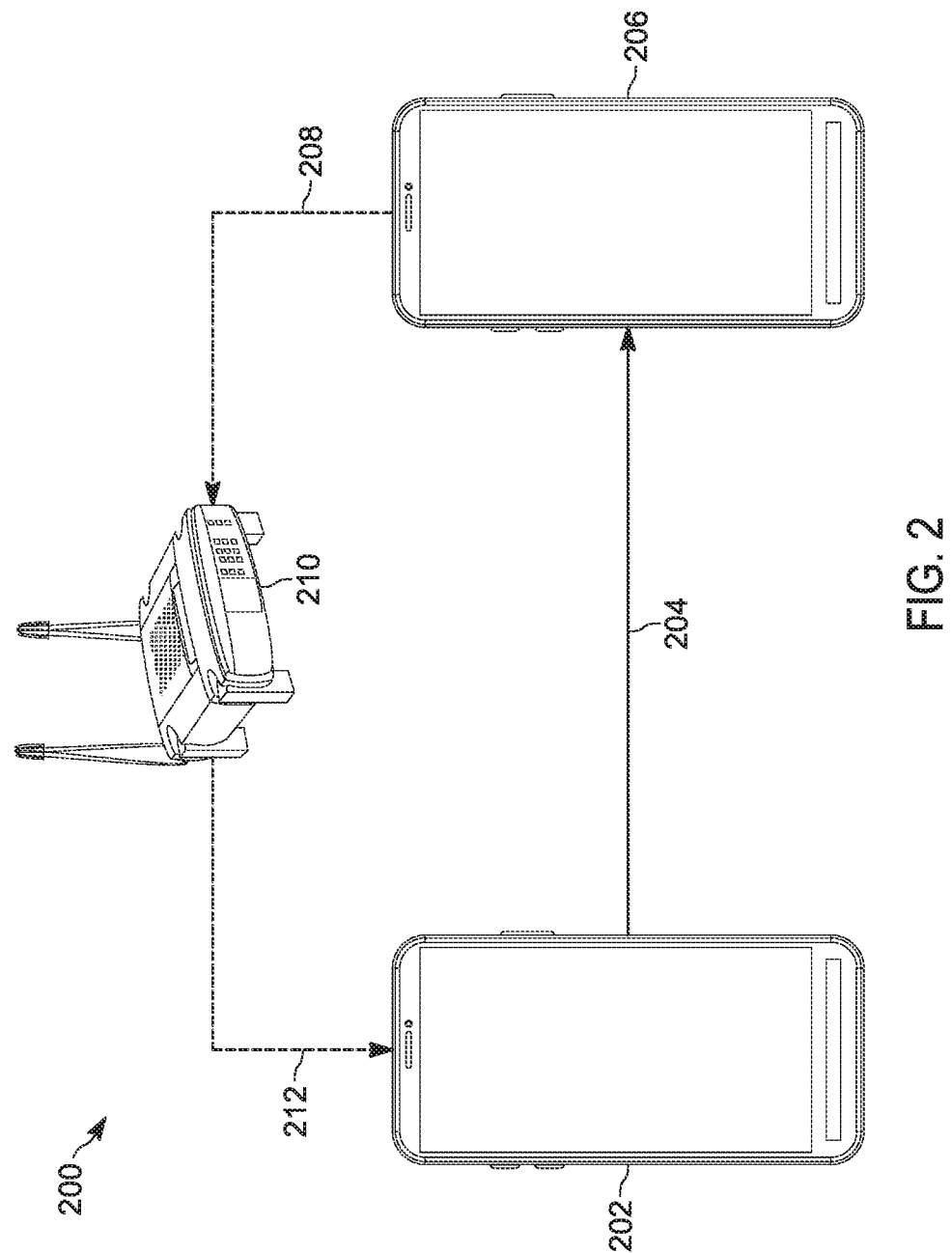
FIG. 2 is a schematic diagram of an example communication system in accordance with some embodiments.

FIG. 2 shows an example communication system 200 in accordance with some embodiments. Other embodiments may include some, none, or any combination of the elements shown in FIG. 2. Other embodiments may include additional elements. The communication system 200 includes a first radio 202 and a second radio 206. The first radio 202 is shown transmitting a talk group call 204 to the second radio 206 via a channel. The first radio 202 may transmit the talk group call 204, using a variety of applications. For example, the first radio 202 may transmit the talk group call 204 based on a push to talk (PTT) application. The PTT application may be activated when a user employs an interface, such as pressing and holding a button.

The first radio 202 and the second radio 206 may be said to be part of a talk group, allowing communication between the two radios 202 and 206. Other radios may be included in the talk group simultaneously, at other times, or both. The second radio 206 may need to transmit a high priority call using the channel occupied by the talk group call 204 or another resource.

The second radio 206 is receiving the talk group call 204 from the first radio 202. Because the first radio 202 is transmitting the talk group call 204, the channel used by the first radio 202 to transmit the talk group call 204 may be occupied. Accordingly, the second radio 206 may not be able to use the talk group to transmit a request for a high priority call 208.

To allow the transmission of the high priority call, the communication system 200 includes a gateway 210. The second radio 206 transmits the request for the high priority call 208 to the gateway 210. The gateway 210 may be any device used to connect radios to a network. So that the high priority call can be transmitted, the gateway 210 facilitates the de-keying of the first radio 202 as follows. The gateway 210 receives the request for the high priority call 208 from the second radio 206. In response to the request for a high priority call 208, the gateway 210 is operable to transmit an interrupt signaling message 212 to the first radio 202.

The gateway 210 may be operable to transmit the interrupt signaling message 208 through a broadband channel to the first radio 202. The first radio 202 is operable to receive the interrupt signaling message 212 through the broadband channel. The gateway 210 may be operable to transmit the interrupt signaling message through other channels.

The interrupt signaling message 212 may include instructions to de-key from the talk group call. The interrupt signaling message 212 may include instructions to make a high priority call decision. The high priority call decision may include de-keying from the talk group call. Therefore, the first radio 202, upon receiving the interrupt signaling message 212, may be operable to de-key from the talk group call 204, thereby permitting the second radio 206 to use the channel previously occupied by the talk group call 204. The high priority call decision may include moving to a new frequency. The second radio 206 may then transmit a talk group call to the first radio 202, other radios, or both.

The first radio 202 may be an intended recipient of the high priority call. The interrupt signaling message 212 may therefore instruct the first radio 202 to accept the high priority call. The first radio 202 may be operable to accept the high priority call in response to the interrupt signaling message 212. The first radio 202 may not be an intended recipient of the high priority call. The interrupt signaling message 212 may instruct the first radio 202 to not accept the high priority call.

FIG. 2 depicts only an example communication system 200. The talk group call 204 may be any electronic signal, containing electronic data. Such electronic data may include, for example, audio data. The talk group call 204 may be transmitted using one or more frequency division multiple access (FDMA) protocols. For example, the first radio 202 may be operable to communicate on a first dedicated frequency and the second radio 206 may be operable to communicate on a second dedicated frequency. The talk group call 204 may be transmitted using other protocols such as time division multiple access (TDMA). The talk group call 204 may be in any format, such as a trunked group call or a unit-to-many call. While only two radios are shown in FIG. 2, the communication system 200 may be used with any number of radios.

Figure 3:
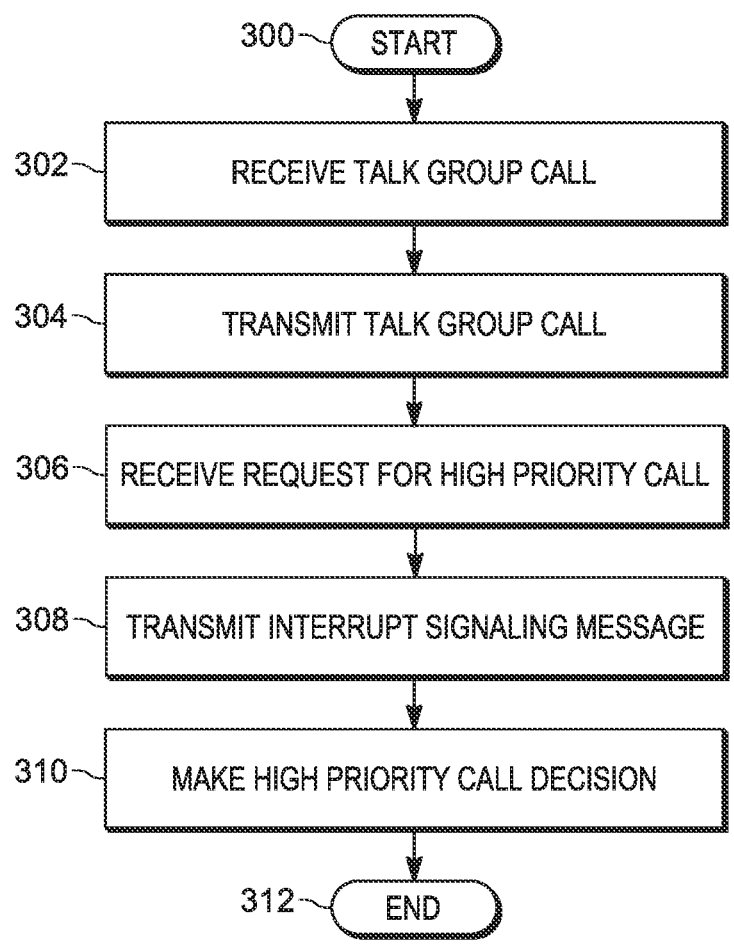
FIG. 3 is a flow chart of an example method for interrupting a radio for a high priority call in accordance with some embodiments.

FIG. 3 depicts, in accordance with some embodiments, an example method for interrupting a talk group call so that a high priority call may be taken. Other embodiments may include some, none, or any combination of the elements shown in FIG. 3. The method may include additional steps. The method starts at block 300. At step 302, the method includes receiving a talk group call. The talk group call can be received by a radio or an FNE, for example. At step 304, the method includes transmitting a talk group call. The talk group call may be transmitted by a radio, by an FNE, or both. At step 306, the method includes receiving a request for a high priority call. The request can be received by an FNE or by a gateway. At step 308, the method includes transmitting an interrupt signaling message. The interrupt signaling message may be sent by a gateway. The interrupt signaling message may be received by a radio. At step 310, the method includes making a high priority call decision. The high priority call decision may be made by a radio. The method ends at step 312.

"Radio" as used herein may include any subscriber unit operable to transmit electromagnetic waves. "First", "second," "third" and like terms as used herein are used solely for the purposes of clarity in discussion. They do not describe any particular type of element. Aspects of any one or more figures may be combined with or substituted for aspects of any one or more figures.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims, including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or device that comprises, has, includes, contains a list of elements does not include only those elements but may include other elements not expressly listed or inherent to such process, method, article, or device. An element proceeded by "comprises . . . a," "has . . . a," "includes . . . a", "contains . . . a" does not, without more constraints, preclude the existence of additional identical elements in the process, method, article, or device that comprises, has, includes, contains the element. The terms "a" and "an" are defined as one or more unless explicitly stated otherwise herein. The terms "substantially,"

"essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or device described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A communication system, comprising:
a fixed network equipment (FNE) operable to:
    receive a talk group call from a first radio;
    transmit the talk group call to a second radio; and
    receive a request for a high priority call; and
a gateway operable to transmit, subsequent to the FNE receiving the request for the high priority call, an interrupt signaling message to the first radio through a broadband channel other than a channel over which the FNE receives the talk group call from the first radio, the interrupt signaling message comprising instructions for the first radio to de-key from the talk group call.

2. The communication system of claim 1 wherein the FNE is further operable to, in response to the request for the high priority call, instruct the gateway to transmit the interrupt signaling message.

3. The communication system of claim 1, wherein the interrupt signaling message instructs the first radio to accept the high priority call.

4. The communication system of claim 1, wherein the interrupt signaling message instructs the first radio to not accept the high priority call.

5. The communication system of claim 1, wherein the FNE receives the request for the high priority call from a third radio.

6. The communication system of claim 1, wherein:
the FNE is operable to communicate on a first dedicated frequency with the first radio and to communicate on a second dedicated frequency with the second radio.

7. The communication system of claim 1, wherein the talk group call is a trunked talk group call.

8. The communication system of claim 1, wherein the talk group call is a unit-to-many call.

9. A communication system, comprising:
a first radio; and
a second radio, wherein:
    the first radio is operable to transmit a talk group call to a fixed network equipment (FNE);
    the second radio is operable to receive the talk group call from the FNE; and
    the first radio is operable to receive an interrupt signaling message from a gateway through a broadband channel other than a channel over which the first radio transmits the talk group call to the FNE and subsequent to the FNE receiving a request for a high priority call, the interrupt signaling message comprising instructions for the first radio to de-key from the talk group call.

10. The communication system of claim 9, wherein the first radio is operable to accept a high priority call in response to the interrupt signaling message.

11. The communication system of claim 9, further comprising a third radio, wherein:
the third radio is operable to transmit the request for the high priority call to the FNE; and
the interrupt signaling message is received from the gateway in response to the FNE instructing the gateway to transmit the interrupt signaling message.

12. The communication system of claim 9, wherein the first radio communicates on a first dedicated frequency and the second radio communicates on a second dedicated frequency.

13. The communication system of claim 9, wherein the talk group call is a trunked talk group call.

14. The communication system of claim 9, wherein the talk group call is a unit-to-many call.

15. A communication system, comprising:
a first radio operable to communicate with a second radio in a talk group call;
a gateway operable to:
    receive a request for a high priority call; and transmit an interrupt signaling message to the first radio through a broadband channel other than a channel over which the first radio communicates with the second radio, the interrupt signaling message comprising instructions for the first radio to make a high priority call decision.

16. The communication system of claim 15, wherein the high priority call decision comprises de-keying from the talk group call.

17. The communication system of claim 15, wherein the high priority call decision comprises moving to a new frequency.

18. The communication system of claim 15, wherein the talk group call is a trunked talk group call.

19. The communication system of claim 15, wherein the talk group call is a unit-to-many call.

20. The communication system of claim 15, wherein the first radio is operable to accept the high priority call in response to the interrupt signaling message.

* * * * *